United States Patent [19]
Whittle

[11] 3,919,021
[45] Nov. 11, 1975

[54] METHOD OF REPAIRING TIRE CASINGS

[76] Inventor: Benjamin Whittle, Rte. 3, Paw Paw, Mich. 49079

[22] Filed: Feb. 17, 1971

[21] Appl. No.: 116,120

Related U.S. Application Data

[62] Division of Ser. No. 790,198, Jan. 10, 1969, Pat. No. 3,577,592.

[52] U.S. Cl. .............. 156/97; 81/15.2; 152/368; 152/370; 156/267; 156/293; 264/36; 264/45.2; 264/46.6
[51] Int. Cl.² B29H 5/16; B60C 21/02; B60C 21/06
[58] Field of Search ...... 156/97, 267, 293; 152/367, 152/368, 369, 370; 81/15.2; 264/36, 45.2, 46.6

[56] References Cited
UNITED STATES PATENTS

| | | | |
|---|---|---|---|
| 765,324 | 7/1904 | Sampson | 152/369 |
| 1,942,116 | 1/1934 | Mullen | 152/370 |
| 2,229,878 | 1/1941 | Wilson | 156/97 X |
| 2,620,852 | 12/1952 | Forbush | 156/97 X |
| 2,837,767 | 6/1958 | MacDonald | 156/97 X |

*Primary Examiner*—Clifton B. Cosby

[57] ABSTRACT

Flexible plug rubber is cured into the void formed by a break in a casing by retaining the rubber between inner and outer plates, while holding the plates against opposite sides of the casing by tension strands passed through the casing and the plates. The strands are cut off after the plug is set. The strands may pass centrally through the void and the plug material, or in spaced relation through uninjured parts of the casing.

A variation shows the tension strand also passing through an inner patch so that the patch is attached to the inside of the casing at the same time that the plug rubber is cured in place.

5 Claims, 14 Drawing Figures

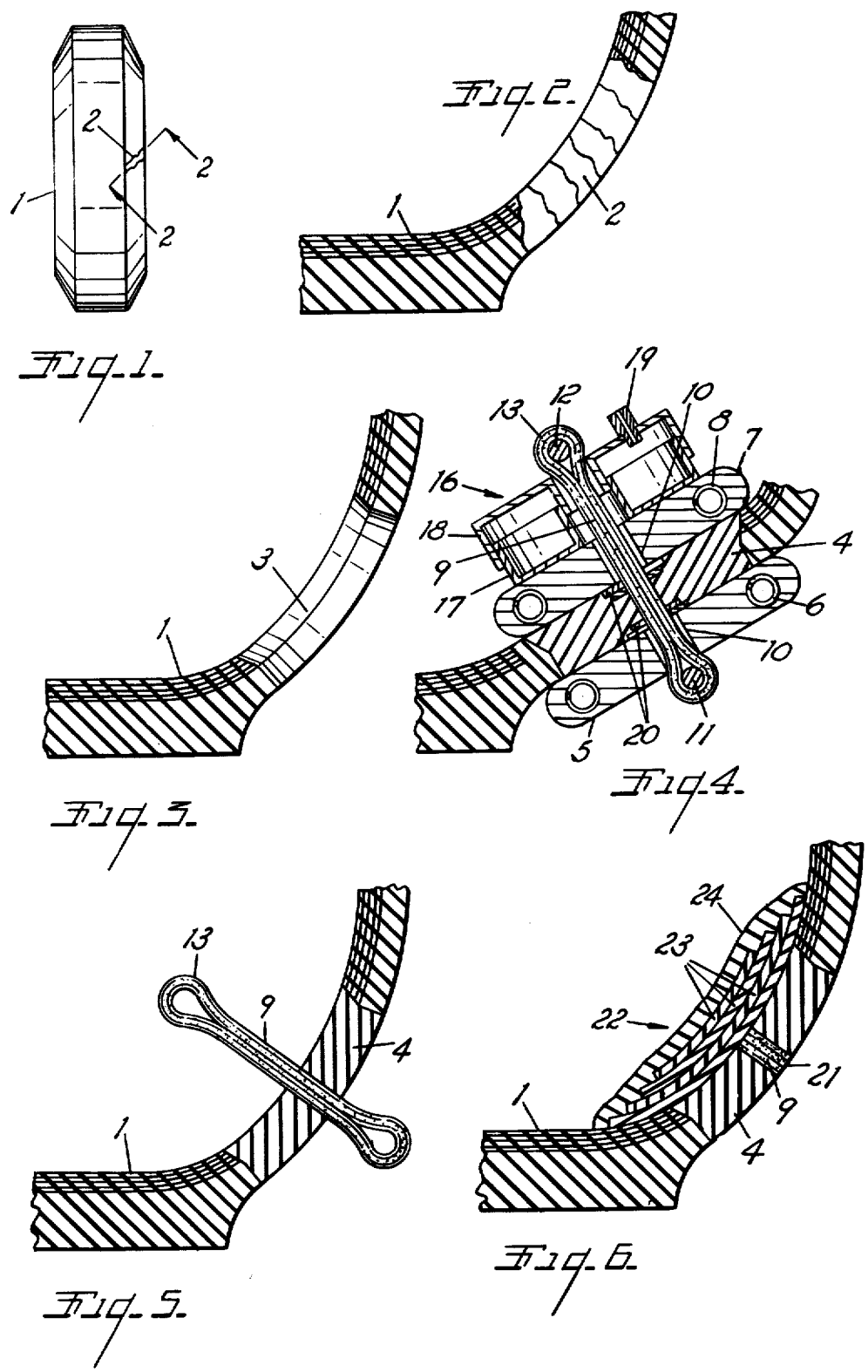

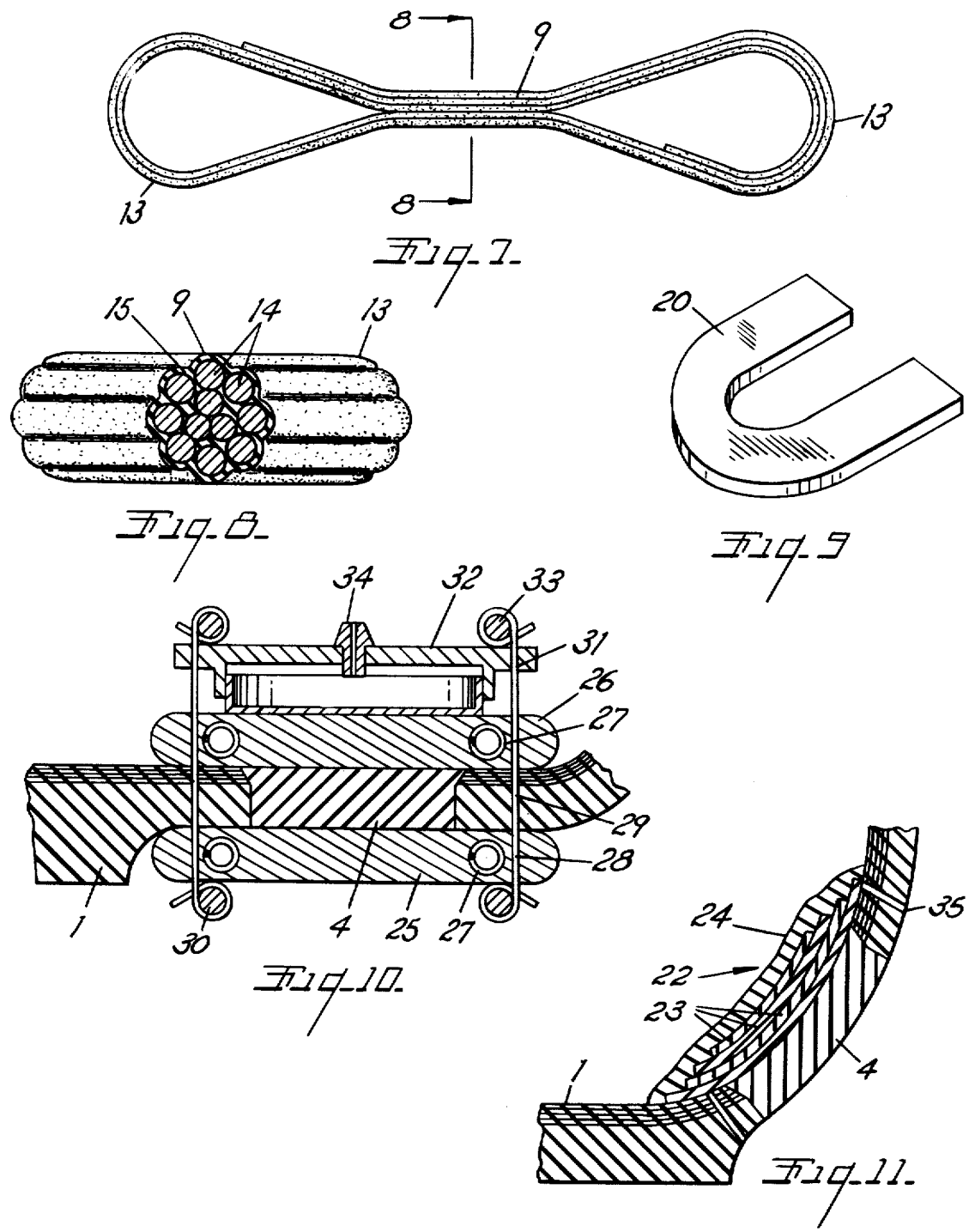

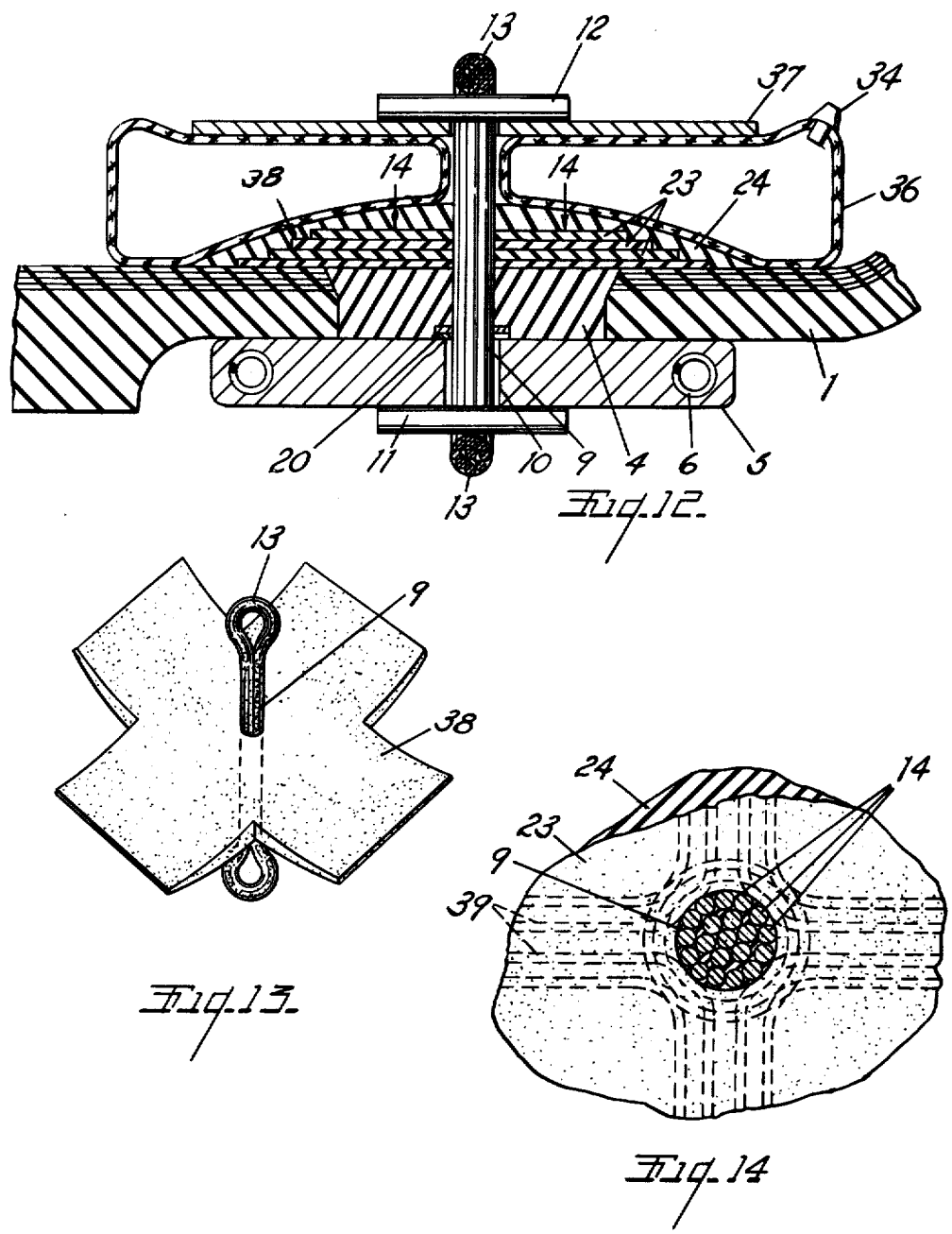

METHOD OF REPAIRING TIRE CASINGS

RELATED APPLICATION

This application has been divided from the copending application for Method Of Repairing Tire Casings And Patch Therefor, Ser. No. 790,198, filed Jan. 10, 1969 now U.S. PAt. No. 3,577,592.

The object of the invention is to reduce the cost of repairing large breaks in the casings of heavy duty tires by:

Providing inexpensive mold plates that hold the break filling plug rubber in place by means of tension strands passed through the casing wall while the rubber is cured.

Providing a plug rubber filling for a break in a casing that is substantially imperforate and ready to receive a load bearing patch over its inner surface.

And by providing a load bearing inner patch with a tension member extending perpendicularly through its center, so that the patch can act as an inner mold surface for the plug rubber, and be attached to the casing at the same time that the plug rubber is cured in the break in the casing.

The drawings, of which there are three sheets, illustrate three variations of the repairing method of the invention, and three variations of the apparatus for performing the patching operation.

FIG. 1 is an edge elevational view of a tire casing.

FIG. 2 is an enlarged, fragmentary, cross sectional view taken along the plane of the line 2—2 in FIG. 1, and through a break in the casing.

FIG. 3 is a cross sectional view showing the edges of the break prepared for patching.

FIG. 4 is a cross sectional view showing one form of the repair apparatus in place for performing a second step in the patching operation.

FIG. 5 is a cross sectional view showing the apparatus removed after completion of the plugging operation.

FIG. 6 is a cross sectional view showing the casing with the break plugged and with a load bearing patch in place over the newly formed plug.

FIG. 7 is an elevational view of one form of tension strand used to hold the plug forming molds in place.

FIG. 8 is a cross sectional view taken along the plane of the line 8—8 in FIG. 7.

FIG. 9 is a perspective view of the retaining clip used in FIGS. 4 and 12.

FIG. 10 is a cross sectional view through a first modified form of the repair apparatus as applied to a casing.

FIG. 11 is a cross sectional view showing a casing repaired with a plug applied by the apparatus shown in FIG. 10, with a load carrying patch applied over the plug.

FIG. 12 is a cross sectional view through a second modified apparatus for plugging a break in a casing.

FIG. 13 is a perspective view of a load carrying patch for use in cooperation with the apparatus of FIG. 12.

FIG. 14 is an enlarged, fragmentary, cross sectional view taken along the plane of the line 14—14 in FIG. 12.

FIG. 1 conventionally illustrates a heavy duty tire casing 1 with an irregular break therein at 2. The break is shown in the side wall portion of the tire but may occur at any position. As is shown more clearly in FIG. 2, the edges of the break are irregular and before attempting to repair the casing the surfaces of the break are cut away to provide a smooth surface opening 3 as shown in FIG. 3. After the break opening has been smoothed, the void in the casing wall is filled with a mass of uncured plug rubber 4 as shown in FIG. 4. The term "rubber" is used to indicate natural or synthetic rubber or similar elastic materials which can be cured to a permanent flexible condition by chemical action or by application of heat.

The apparatus for forming and curing the plug rubber 4 consists of an outer mold member or plate 5 which may have heating elements 6 embedded therein for applying heat to the uncured plug rubber. An opposed inner mold member or plate 7, also provided with heating elements 8 is positioned against the inner surface of the plug rubber and extends therebeyond to engage the inside of the casing surrounding the break. The mold members are held in clamped relation against the inner and outer surfaces of the casing by a central tensile strand 9 which passes through holes 10 formed centrally in the mold members to anchor pins 11 and 12 which are removably passed through loops at the ends of the tensile strand 9. As appears more clearly from FIGS. 5, 7 and 8, a preferred form of the tensile strand consists of a continuous length of cord material made of either natural or synthetic fibers and wound into a loop of several turns. The center of the loop is collapsed to form the tensile strand leaving end loops 13 through which the anchor pins 11 and 12 extend. The several cords 14 of the tensile strand are individually coated and embedded in uncured rubber indicated at 15. The rubber surrounding the tensile strand is cured simultaneously and bonded with the rubber 4 of the plug.

A tensioning member, indicated generally at 16, is positioned between one of the anchor pins and one of the mold plates to stretch the tensile strand and compress the plates on the opposite sides of the casing. The example of the tensioning member consists of a torus shaped pneumatic cylinder having an inner member 17 bearing against the inner mold member 7 and an outer member 18 in sealing and slidable relation to the inner member. A valve indicated conventionally at 19 is provided for introducing compressed air into the tensioning member to draw the tensile strand 9 tight and to press the mold members against the casing. In order to prevent the uncured plug rubber 4 from escaping into the openings 10 in the mold members, U-shaped sealing clips 20 are positioned in crossing relation to each other and to the tensile strand at the surface of each of the mold members. One of the sealing clips is illustrated more particularly in FIG. 9.

After the plug rubber 4 has been cured in the retained position shown in FIG. 4 the expanding or tensioning member 16 is deflated to permit the removal of the anchor pins 11 and 12 after which the mold members 5 and 7 and the expanding member 16 are removed leaving the casing in the condition shown in FIG. 5 with the tensile strand cured into the plug rubber 4 and with the loops 13 projecting from the surface of the casing. The projecting portions of the tensile strand are cut off flush with the surfaces of the mold rubber as shown at 21 in FIG. 6 and a load carrying patch indicated generally by the numeral 22 is applied to the inner surface of the casing and across the inner surface of the plug rubber. Desirably the load carrying patch is of the type having a plurality of fabric reinforced plies 23 arranged in crossing relation, with an inner coating of rubber 24 covering the inner surface of the patch and extending beyond the peripheries of the plies.

FIGS. 10 and 11 illustrate a modified form of method and apparatus for patching a similar break in a tire casing. The casing is again indicated at 1 with the plug rubber 4 in place in the trimmed break. The outer mold member 25 and the inner mold member 26 are flat metallic plates with heatinig elements 27 therein if desired. The plates have no central holes or openings but instead are provided with spaced bores 28 which pass plural tensile strands 29. The strands 29 may be of any material having sufficient tensile strength to hold the mold plates against the sides of the casing. In the example illustrated the strands 29 are wires having one end wrapped around anchor pins 30 on the outer side of the outer mold plate. The inner ends of the strands are passed through holes 31 in the sides of an expansible pressure cylinder 32 and wrapped around inner anchor pins 33. A valve stem conventionally illustrated at 34 permits the cylinder 32 to be expanded to tension the strands 29 and clamp the mold plates against the tire.

After the mold rubber is cured, the anchor pins 30 and 33 are removed together with the expansible cylinder and the mold plates and the ends of the tensile wires 29 are cut off as at 35 in FIG. 11. The load carrying patch 22 is then applied over the inner surface of the plug rubber and the inner ends of the tensile strands. Alternatively, the tensile strands 35 may be removed entirely with the small holes which they formed through the casing being closed at their inner ends by the patch 22.

FIGS. 12 and 14 show a third modified form of apparatus and method for curing the plug rubber 4 in the break of the casing 1. The outer mold member consists of a flat plate 5 similar to that shown in FIG. 4 and having a heating element 6 therein and a central opening or hole 10 extending therethrough. The tensile strand 9 is the same as that shown in FIGS. 4, 5 and 7 and has its outer loop 13 disposed around the anchor pin 11. Inwardly of the patch rubber and the inner surface of the casing, the tensile strand 9 passes through the center of a load carrying patch. The patch may be similar to the patch 22 being provided with overlapping plies of reinforced fabric 23 and having a rubber coating 24. Since the patch tapers in thickness from its center to its edges a desirable pressure member in the form of a torus shaped flexible bag 36 is positioned against the inner surface of the patch with the tensile strand 9 extending through the center of the torus. The rigid backing plate 37 engages the inside of the bag and supports the anchor pin 12 for the inner loop 13 of the tensile strand. Again a valve stem 34 is provided for introducing air pressure into the bag to tension the strand. The same U-shaped clips 20 may be used around the tensile strand to prevent leakage through the outer mold plate.

The patch generally indicated at 38 may have the tensile strand 9 engaged therethrough prior to application of the patch and the tensile strand to the casing, or the tensile strand may be forced through the patch at the same time that it is passed through the plug rubber and the break in the casing. Desirably the several cords 14 of the tensile strand 9 are passed carefully through the plies 23 and 24 of the patch 38 as is shown in FIG. 14 so as to pass between the several reinforcing strands 39 of the plies without damaging the latter or reducing the strength of the patch. While various forms of inner patches 22 and 38 may be used in the patching method of the invention, patches having relatively flexible edges, and a modulus of elasticity that increases toward the center of the patch is preferred. Such patches are disclosed and claimed more particularly in my copending application, Ser. No. 479,136, filed Aug. 12, 1965 for Patch For Tires.

Each form of the patching method eliminates the need for expensive and heavy C-clamps for holding the inner and outer clamp or mold plates together, and the need for different sized plugs to repair breaks of different sizes is eliminated. In addition, the modified method shown in FIGS. 12 to 14 attaches an inner, load carrying, patch at the same time that the hole in the casing is plugged.

While the drawings show repairs made in the sidewall portion of a casing, the apparatus and method shown are equally applicable to breaks that occur in the thicker tread portion of the casing. Where the the patch is applied to a thicker part of the tire, the tension strands 9 and 29 will naturally be longer.

What is claimed as new is:

1. The method of patching a break in a tire casing which comprises the steps of
    filling the break with plug rubber between the inner and the outer surfaces of the casing,
    retaining the plug rubber in the break by inner and outer mold members having their edges lapped over undamaged and unaltered portions of the inner and outer surfaces of the casing,
    holding said mold members in rubber retaining position by means of a tensile strand passed through the central portion of the break and embedded in said plug rubber and connected at its ends to the mold members,
    curing the plug rubber while so held by said mold members,
    removing said mold members but leaving said tensile strand embedded in said plug rubber when cured,
    cutting away the exposed inner portion of said strand after said mold members are removed,
    and applying a load carrying patch over the inner side of said plug rubber and the inner end of the embedded portion of said strand and the adjacent area of the inside of said casing,
    said tensile strand being relatively thin and narrow as compared to its length and being relatively laterally flexible and bendable but relatively longitudinally inextensible.

2. The method of patching a break in a tire casing which comprises the steps of
    filling the break with plug rubber from the inner side to the outer side of the casing,
    retaining the plug rubber in the break by an inner load carrying patch lapped against the inside of the plug rubber and the adjacent area of the inside of the casing and by inner and outer mold members having their edges lapped over undamaged and unaltered portions of the inner and outer surfaces of the casing,
    holding said mold members in rubber retaining position by means of a tensile strand passed through said patch and said mold members and connected at its ends to said mold members,
    said strand having relatively high tensile strength and resistance to elongation but relatively low resistance to lateral bending,
    curing said plug rubber while so held by said patch and said mold members and simultaneously bonding said patch to the inside of said casing and said plug rubber, and removing said mold members when said plug rubber is cured and said patch is bonded.

3. The method as defined in claim 2 in which said tensile strand comprises plural loops of fabric with their central portions bunched together and coated with uncured rubber where the bunched portions pass through the casing and the plug rubber.

4. The method of patching a break in a tire casing which comprises the steps of filling the break with plug rubber between the inner and the outer surfaces of the casing, placing a load carrying patch across the inside of said plug rubber and the adjacent portions of the inner side of said casing, retaining the patch in the casing and the plug rubber in the break by inner and outer mold members having their edges lapped over undamaged and unaltered portions of the inner and outer surfaces of the casing, holding said mold members in such lapped positions by means of a tensile strand passed through said casing and said patch and through holes provided therefor in said mold members, engaging the ends of said strand to inner and outer anchors with one of the anchors in compressive retaining relation to one of said mold members, pneumatically applying a spreading force radially of said casing between the other of said anchors and the other of said mold members to tension said strand and draw said mold members against said patch and the outer side of said casing, curing the plug rubber and adherring said patch to said casing while so held between said mold members, and removing said mold members when said plug rubber is cured, said tensile strand being relatively thin and laterally bendable and flexible but relatively longitudinally inextensible.

5. The method as defined in claim 4 in which plural tensile strands are passed through said patch and said casing in spaced relation to the break in the casing and through spaced holes provided therefor in said mold members, said tensile strands being wires wound around said anchors at the opposite sides of the mold members.

* * * * *